Feb. 9, 1954  H. FRIESS  2,668,880
APPARATUS FOR STEREOPHONIC SOUND-RECORDING
Filed May 25, 1951  4 Sheets-Sheet 4
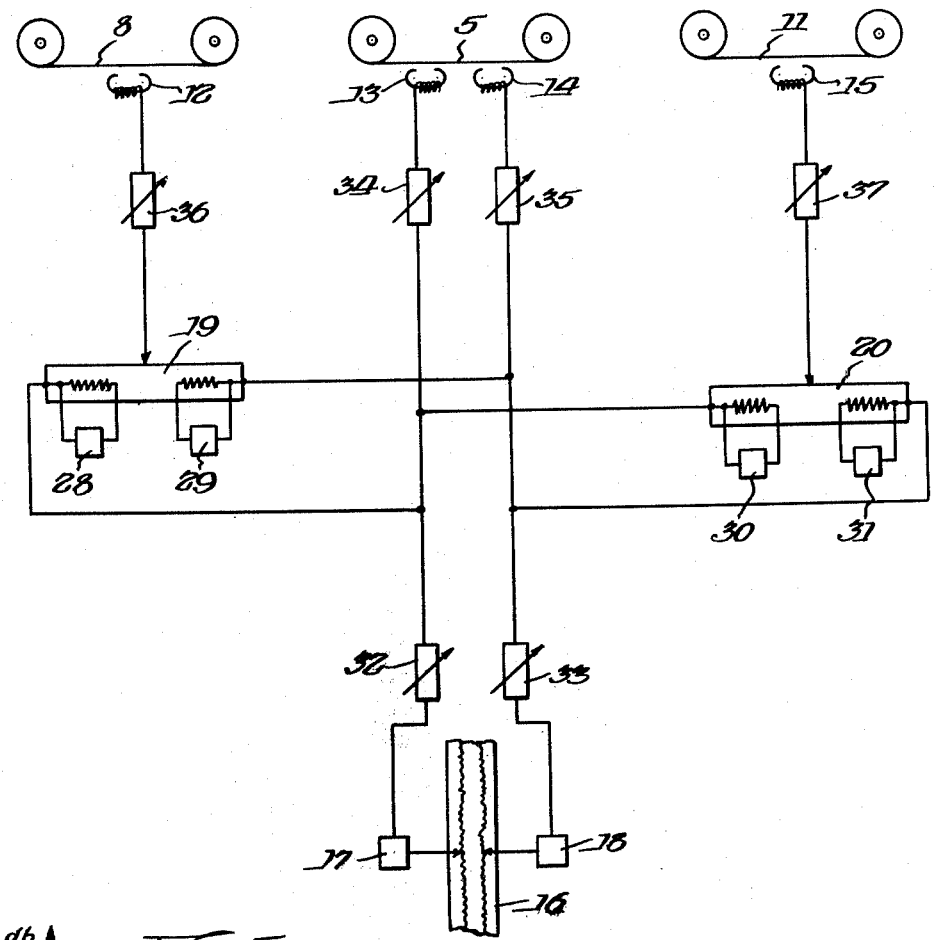
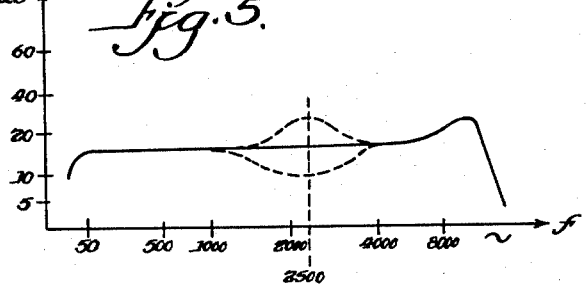
Inventor,
Hans Friess.

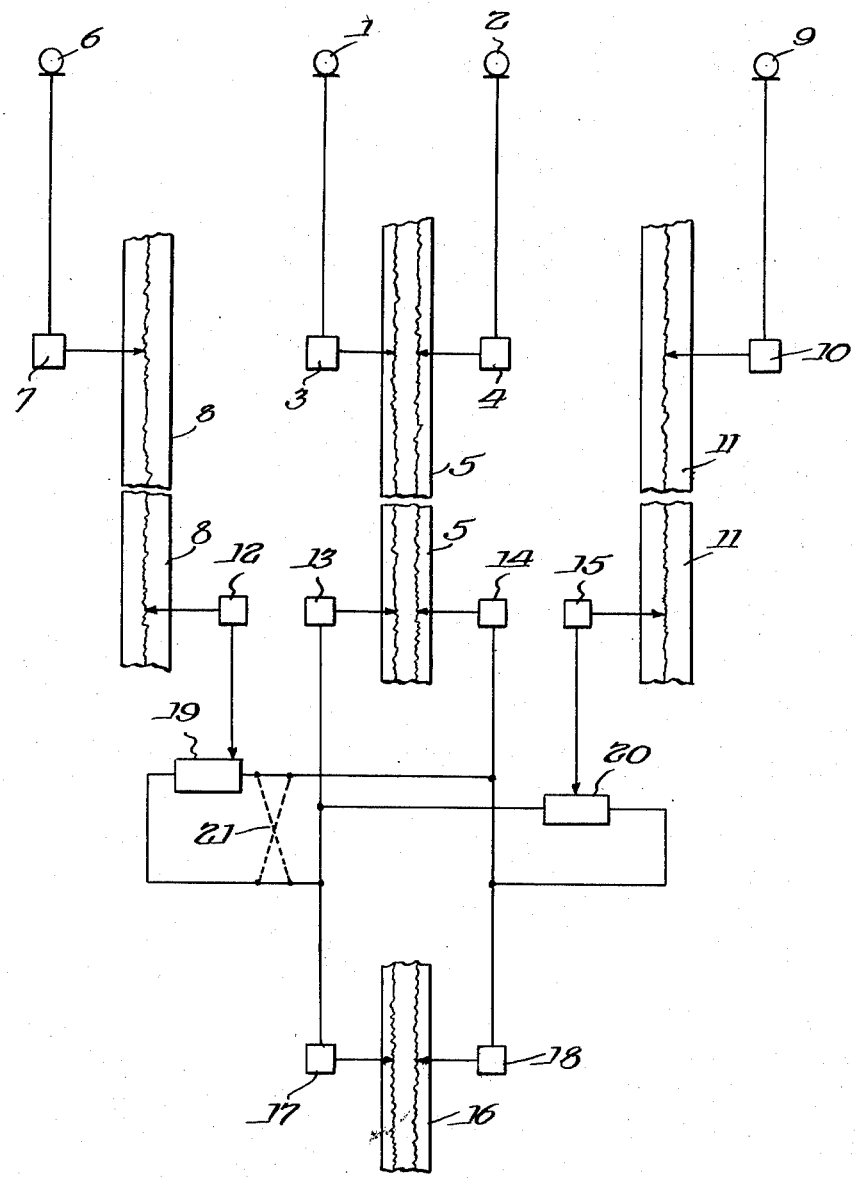

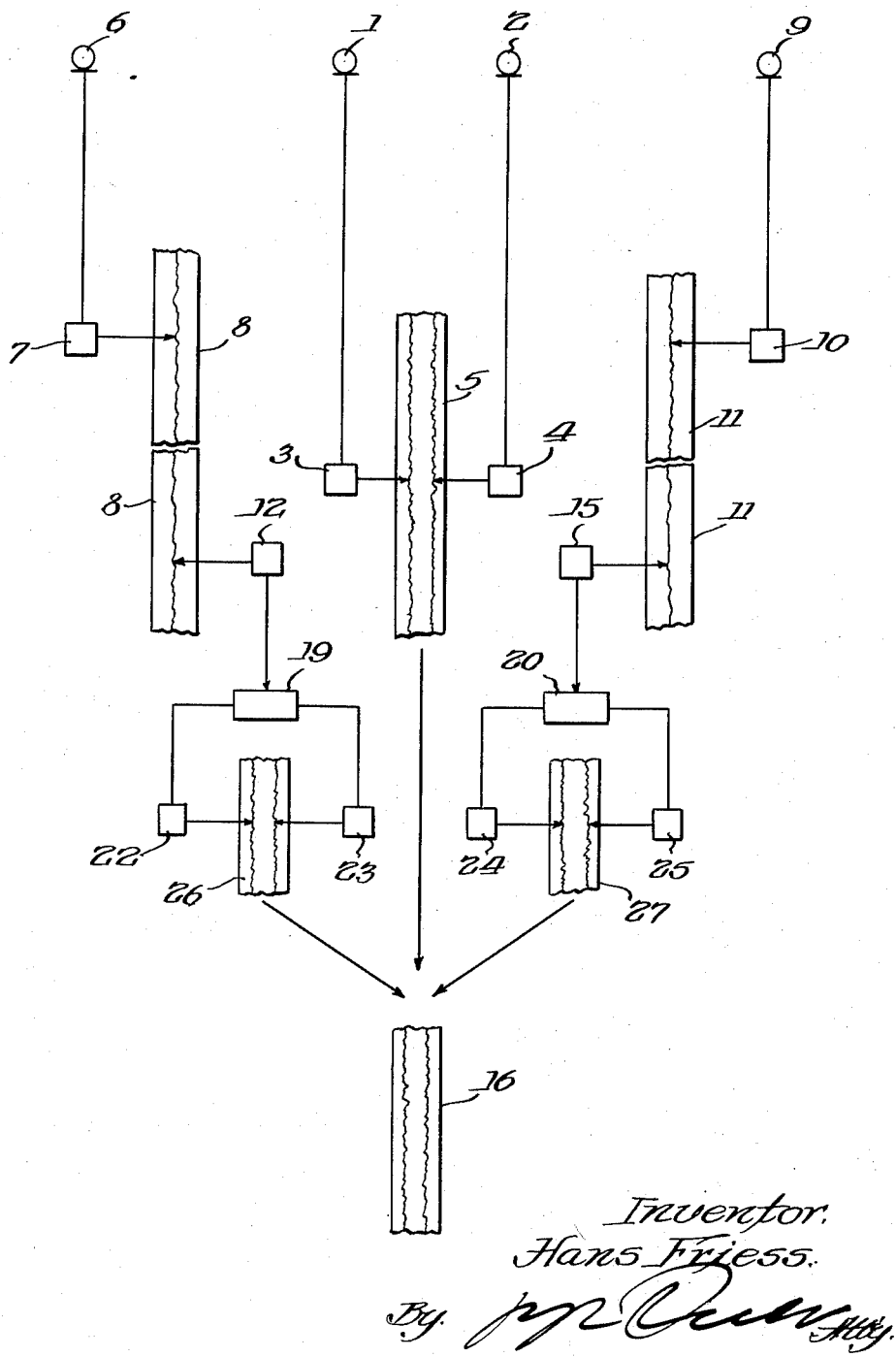

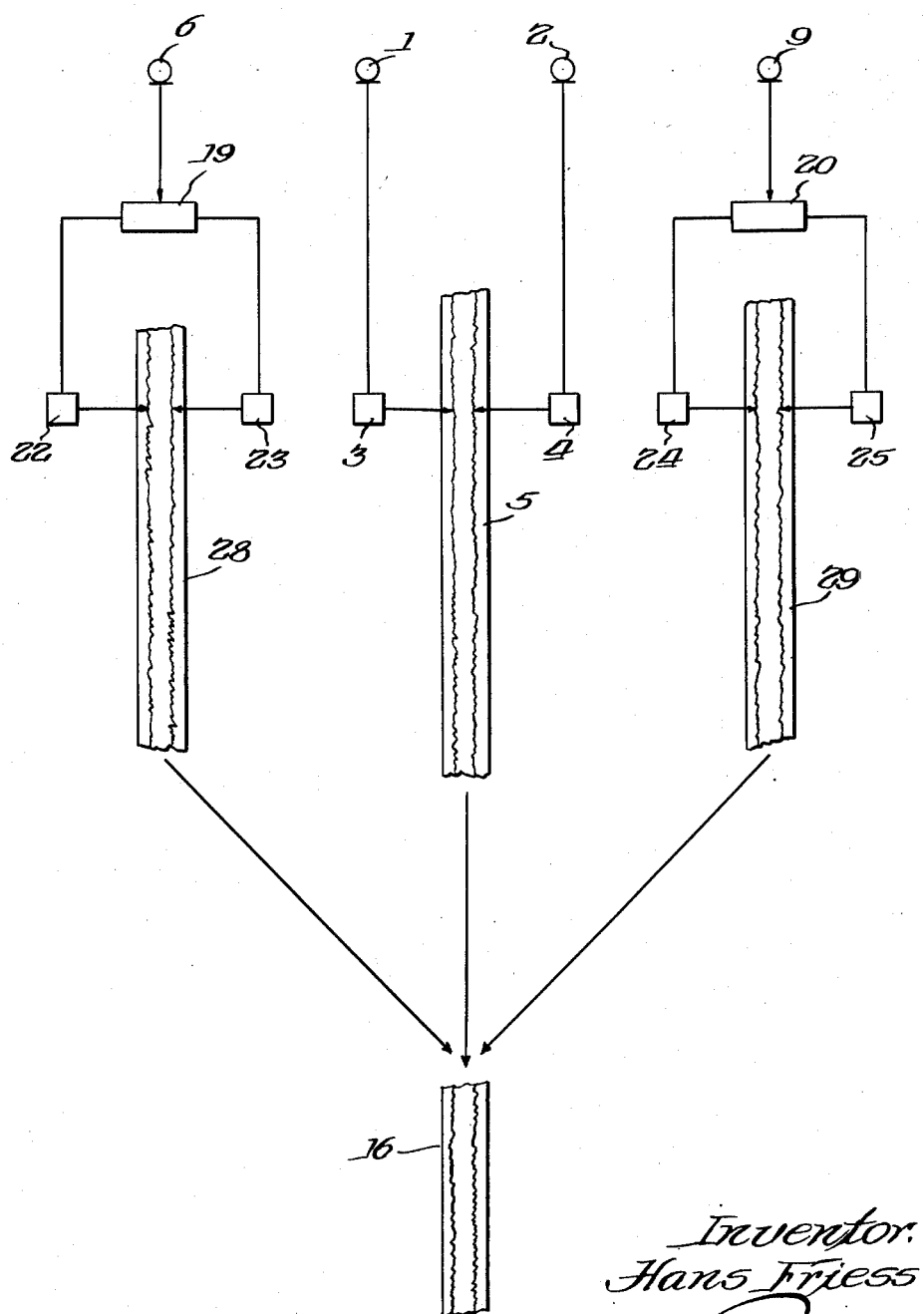

Patented Feb. 9, 1954

2,668,880

UNITED STATES PATENT OFFICE 2,668,880

APPARATUS FOR STEREOPHONIC SOUND-RECORDING

Hans Friess, Karlsruhe-Daxlanden (Baden), Germany, assignor to Klangfilm Gesellschaft mit Beschraenkter Haftung, Berlin, Germany, a corporation of Germany Application May 25, 1951, Serial No. 228,193

Claims priority, application Germany May 26, 1950

14 Claims. (Cl. 179—100.3)

This invention is concerned with a method of and apparatus for stereophonic sound-recording.

It was customary heretofore, in stereophonic sound-recording, e. g., in the production of sound pictures, to make multi-channel recordings of individual production phases and record them upon carriers having at least two sound tracks which, after cutting and comparing with the picture, were by re-playing and mixing transcribed upon the player or production film. The procedure requires a considerable expenditure incident to the production of the picture and incident to the required recording.

The invention proposes to simplify the procedure.

It is proposed, in accordance with the invention, to make multi-channel recordings of certain production phases and single-channel recordings of others, and to mix the single-channel recordings with the multi-channel recordings by branching into a plurality of channels to produce the production film. Multi-channel recording apparatus is then required for parts of the scenes or production phases, e. g., for orchestral music, choirs and mass scenes. Single-channel recording apparatus will suffice for solo voices and generally for speech and also for sound effects.

In the branching of the single-channel recordings to a plurality of channels, the invention proposes to adjustably arrange the amplitude relationship of the sound voltages in these channels. It is possible, in accordance with the invention, to simulate incident to the reproduction an apparent motion or displacement of the sound source in lateral direction, and similarly by common variation of the sound voltages in all channels to simulate a displacement or motion of the sounds in depth.

The various objects of the invention will now be explained by reference to the accompanying drawings. In these drawings, Figs. 1–3 indicate in diagrammatic manner arrangements of means for practicing the new method;

Fig. 4 shows in like diagrammatic representation means employed in a re-play and mixing for raising or lowering the frequencies by amounts of several db to obtain particular acoustic effects; and Fig. 5 indicates the form of a frequency curve that may be obtained by the use of anti-distortion means incorporated in Fig. 4.

Referring now to Fig. 1: there is provided multi-channel recording apparatus comprising at least two microphones 1 and 2 which are connected with the sound-recording devices 3 and 4 by way of the usual transmission channels which include the required amplifiers and also devices for smoothing out distortions and certain regulating means. The sound-recording devices 3 and 4 may be optical-acoustical recording devices or magnetic sound recorders or other equipment suitable for the purpose. The arrangement may be used for recording mass scenes, orchestral music, choirs and the like, and produces upon the carrier 5 two sound tracks.

In addition, there is provided a single-channel recording apparatus for solo voices and speech, which comprises the microphone 6 serving to record, through the medium of the sound-recording device 7, a sound track upon the carrier 8.

An additional single-channel apparatus is provided which includes the microphone 9 and the recording device 10 for producing a sound track upon the carrier 11 so as to record, for example, sound effects.

After cutting and comparing, the carriers 5, 8, 11 are scanned in a re-play device by suitable tone-scanning means 12—15 and are recorded upon the two sound tracks of a carrier 16 over a mixing device and by means of the recording apparatus 17, 18. The carrier 16 serves as a production film or as a master film for making a production film.

The single-channel production phases scanned on the films 8 and 11 are upon re-playing branched over the regulators 19, 20 to the two channels comprising the recording apparatus 17, 18. The amplitude relationship may be adjusted in these channels incident to the mixing so as to create an apparent motion or displacement of the sound source recorded in the single channels. Aside from the regulators 19, 20, there may be provided means in the branch channels for regulating therein the phase and, if desired, also the frequency of the oscillations. It is possible in this manner to make the directional effect more natural. The channels may also be exchanged or switched incident to the mixing, e. g., by means of a switch diagrammatically indicated at 21 so as to simulate particularly directional effects.

In the method employing the arrangement shown in Fig. 2, the branching of the single-channel recordings to a plurality of channels is accomplished in a modified manner. This particular method contemplates taking the sound carriers 8 and 11, each of which is provided with a single sound track, to produce by branching over the regulators 19, 20 and the sound-recording device 22—23 and 24—25, respectively, the intermediate films 26, 27 each carrying two sound tracks. The recordings on these intermediate films 26, 27 are, after cutting and comparing, mixed with the recordings on the sound carrier 5 in a re-play apparatus and yield, as in Fig. 1, the common master or production film 16.

In the method according to Fig. 3, the production phases obtained in the single-channel recordings with the use of microphones 6 and 9 are directly recorded by means of recording devices 22—23—24—25, each upon two tracks, on the carriers 28, 29 by branching over the regulators 19, 20. The recordings on the carriers 28, 29 are then, by re-playing, mixed with the multi-channel recordings on the carrier 5 to obtain the master or production film 16.

The invention is generally applicable in sound-recording and sound transmission, e. g., in radio use or incident to transmission from one auditorium to another, and produces particular advantages in the production of films. It is also applicable in the production of trick films and the like.

It is possible, by the use of a summation control ahead of the regulators 19—20, to regulate the amplitude of the oscillations branching to the two channels while retaining their relationship, so as to simulate, e. g., apparent distance variations, that is to say, depth displacement of the sound source. The operation or adjustment may be facilitated by mechanical coupling of the regulator and the summation control e. g., in such a manner that the adjustment of the control lever in one coordinate direction varies the total amplitude, while the relationship is varied incident to adjustment in the other coordinate direction. The sound source during the reproduction will then be subject to apparent shifting in accordance with the direction of adjustment.

Another object of the invention is to obtain, incident to the recording and/or the mixing and re-playing, the raising or lowering, respectively, of certain frequencies within the tranmission range, especially in the median frequency range, e. g., at 2500 cycles, by amounts of several db. It is possible in this manner to vary upon reproduction the acoustic perspective, e. g., to particularly emphasize a voice as it leaves the loudspeaker. The invention provides for this purpose regulable anti-distortion means, particularly in the mixing and re-play device. It is especially suitable to connect these anti-distortion means with the regulators and the summation control in such a manner that it becomes effective in the terminal positions thereof.

A re-play and mixing arrangement of this kind is diagrammatically illustrated in Fig. 4. The arrangement employs tape devices for the re-playing carrying sound recordings upon the tapes 8, 5, 11, respectively. The re-playing to the film 16 takes place in one operation. The regulators 19, 20 include in their terminal positions the anti-distortion means 28—29 and 30—31, respectively, which therefore are switched in upon corresponding adjustment to raise or lower by several db the sound currents of the median frequencies. The result is the impression that the voice or the sound effect is particularly prominently emphasized in one or the other direction. The summation controls 32, 33 and 34, 35 of the two-channel production phase, as well as the summation controls 36, 37 of the shingle-channel recordings may be provided with corresponding anti-distortion means. Regulable anti-distortion means may be employed which are independent of the amplitude regulators.

The frequency curve indicated in Fig. 5 shows that a lowering or raising of the frequency may be obtained for the purpose stated, by the use of the anti-distortion means, within the median frequency range of 2500 Hz.

Changes may be made within the scope and spirit of the appended claims.

I claim:

1. Apparatus for producing stereophonic sound-recordings, comprising first carrier means, plural-channel means for recording predetermined production phases on at least two sound tracks of said first carrier means, separate second and third carrier means, single-channel means for recording predetermined other production phases each respectively on a single track of said second and third carrier means, branch-channel means for each of said single-channel recordings, and means for mixing the recordings of the branch-channel means with the recordings of said plural-channel means to produce a final record having at least two sound tracks.

2. The apparatus as set forth in claim 1, together with means in each of said branch-channel means for regulating the amplitude relationship of the oscillations therein.

3. The apparatus as set forth in claim 1, together with means in each of said branch channel means for regulating the phase of the oscillations therein.

4. The apparatus as set forth in claim 1, together with means in each of said branch-channel means for regulating the frequency of the oscillations therein.

5. The apparatus as set forth in claim 1, together with means for selectively switching said branch channel means relative to said plural channel means.

6. The apparatus as set forth in claim 1, together with means for altering the frequencies in each of said branch-channel means by several db at a frequency range of about 2500 cycles.

7. The apparatus as set forth in claim 1, together with recording means cooperating with said mixing means, and oscillation regulation means in each of said branch-channel means.

8. The apparatus as set forth in claim 1, together with means in at least one of said channel means for adjusting the frequency of oscilations therein by several db at a frequency range of about 2500 cycles.

9. The apparatus as set forth in claim 1, together with anti-distortion means in at least one of said channel means for adjusting the frequency of oscillations therein by several db at a frequency range of about 2500 cycles, regulator and summation control means, said anti-distortion means being connected with said regulator and with said summation control means so as to effect its operative actuation at the terminal positions thereof.

10. Stereophonic sound-recording apparatus comprising a binaural sound carrier having two sound tracks, a pair of single-track carriers, recording and mixing means for combining the respective recordings on said single-track carriers with the recordings on said binaural carrier to form a record on a final carrier having two sound tracks, said recording and mixing means comprising two main channel means for separately transcribing on the two tracks of said final carrier the recordings from the two respective sound tracks of said binaural carrier, and two branch-channel means for separately conducting oscillations from said single-track carriers to each of said main channel means.

11. The apparatus defined in claim 10, together with means in each of said branch-channel means for regulating the oscillations therein.

12. The apparatus defined in claim 10, together with oscillation-control means in said main channel means.

13. The apparatus defined in claim 10, together with oscillation-control means in said main channel means and in said branch-channel means, respectively.

14. The apparatus defined in claim 10, together with means in each of said branch-channel means for regulating the oscillations therein, and means in said branch-channel means for producing intermediate records from the respective recordings on said single-track carriers, each of said intermediate records having two sound tracks.

HANS FRIESS.

References Cited in the file of this patent

UNITED STATES PATENTS

| Number | Name | Date |
|---|---|---|
| 2,075,861 | Mueller | Apr. 6, 1937 |
| 2,402,095 | Slyfield | June 11, 1946 |
| 2,536,664 | Sinnett | Jan. 2, 1951 |
| 2,561,338 | Camras | July 24, 1951 |